(No Model.)
G. FARNUM.
CAR AXLE.
No. 269,926. Patented Jan. 2, 1883.
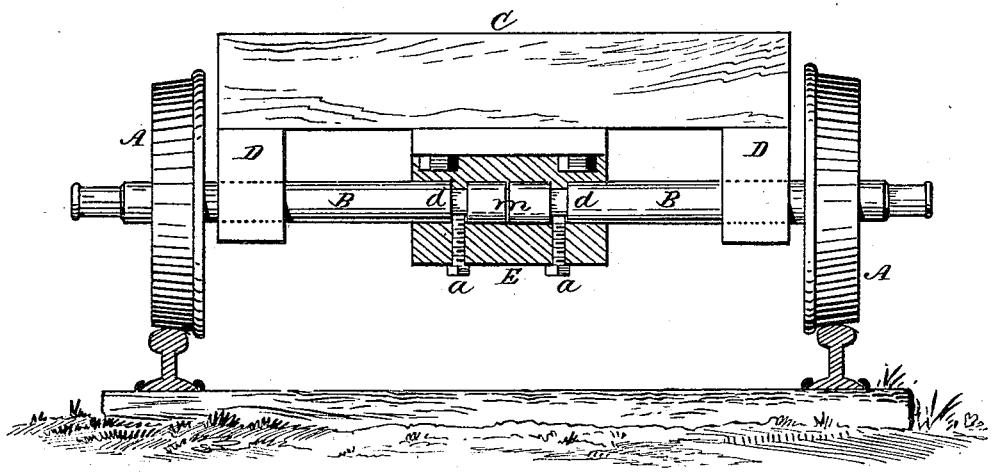
Witnesses:
Alfred Fawcett
E. E. Heath
Inventor:
George Farnum,
pr. C. A. Shaw,
Atty

UNITED STATES PATENT OFFICE.

GEORGE FARNUM, OF SWAMPSCOTT, MASSACHUSETTS.

CAR-AXLE.

SPECIFICATION forming part of Letters Patent No. 269,926, dated January 2, 1883.

Application filed August 24, 1882. (No model.)

*To all whom it may concern:*

Be it known that I, GEORGE FARNUM, of Swampscott, in the county of Essex, State of Massachusetts, have invented a certain new and useful Improvement in Car-Axles, of which the following is a description sufficiently full, clear, and exact to enable any person skilled in the art or science to which said invention appertains to make and use the same, reference being had to the accompanying drawing, forming a part of this specification, which shows an end elevation of a car-truck provided with my improvement, a part of the center axle box or bearing being removed.

It is well known that when a car-truck passes over a curve in the track one set of the wheels traverse a greater distance than the other, thereby causing a part of the wheels to slip or slide while the rest rotate, the friction between the sliding wheels and the track rapidly wearing out the same, and also frequently causing breakage of the wheels and axles.

My invention is designed to obviate these objections and difficulties and at the same time obtain the necessary strength, stiffness, and security; and to that end I construct the axles of the truck in two sections or parts, or so that the wheels are independent of each other, as shown in the drawing, and connect them together by means of a stiffening-frame having central and auxiliary end boxes, as hereinafter described. The axle B is provided with the wheels A A, and the usual end journals, F F, outside the wheels, on which latter the journal-boxes of the truck-frame rest. This axle is divided centrally of its length into two parts or sections, the inner ends of which are journaled in a central box, E, fastened to a stiff cross-bar, C, of the truck-frame. Screw-bolts $a\ a$ pass through slots in the box E, their inner ends entering into annular grooves $d\ d$, surrounding the inner ends of the axle-sections, whereby said sections are held in place. The stiff cross-bar C is provided at its outer ends, inside the wheels, with auxiliary boxes D D, which serve to brace the axle and stiffen it.

It will be obvious that my invention is adapted for use on both horse and steam cars, and that it obviates entirely the difficulties and objections mentioned.

I am aware that car-axles constructed in two parts, arranged endwise of each other, are described in patents now expired; but such, being comparatively insecure, have never come into use, while my continuous bar in one piece, parallel with the axle, having auxiliary boxes at each end inside the wheels, constitutes a brace which imparts strength and security to axles of this class.

What I claim as new, and desire to secure by Letters Patent, is—

The combination of a car-axle having the usual wheels, and journals outside the wheels, said axle being constructed in two parts or sections arranged endwise of each other, the inner ends of said sections being provided with annular grooves, a stiff brace or cross-bar parallel with the axle extending above the same between the wheels, a central journal-box attached to said cross-bar, in which the ends of the axle-sections turn, screw-bolts passing through slots in said central journal-box and entering into the annular grooves of the axle-sections, and auxiliary journal-boxes attached to the outer ends of said cross-bar, inside the wheels, in which the axle-sections turn, substantially as described.

GEORGE FARNUM.

Witnesses:
C. A. SHAW,
ALFRED FAWCETT.